(12) United States Patent
Bohne

(10) Patent No.: US 6,353,615 B1
(45) Date of Patent: Mar. 5, 2002

(54) PROTOCOL FOR CRITICAL SECURITY APPLICATIONS

(75) Inventor: Jürgen Bohne, Berlin (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/180,471

(22) PCT Filed: May 7, 1997

(86) PCT No.: PCT/EP97/02296

§ 371 Date: Mar. 23, 1999

§ 102(e) Date: Mar. 23, 1999

(87) PCT Pub. No.: WO97/42733

PCT Pub. Date: Nov. 13, 1997

(30) Foreign Application Priority Data

May 7, 1996 (DE) .......................................... 196 20 137

(51) Int. Cl.$^7$ ................................................ H04L 12/40
(52) U.S. Cl. ....................................................... 370/442
(58) Field of Search .......................... 370/442, 438–440

(56) References Cited

U.S. PATENT DOCUMENTS 4,161,786 A 7/1979 Hopkins et al.

FOREIGN PATENT DOCUMENTS

EP 0280231 A2 8/1988

OTHER PUBLICATIONS

"The Effect of Acknowledgements on the Performance of Distributed Spread Spectrum Packet Radio Network" by Samuel S. Lee et al. pp. 543–544.
"Performance Comparisons . . . Multiple Access Networks" by Szu–Lin Su et al. pp. 1833–1838.
". . . Integrated Services Terminal Bus" by H. Castermans. pp. 179–184.
"Multifunction Vehicle Bus" International Electrotechnical Commission. Mar. 1994. pp. 79–82.
"SAFEbus" by Henneth Hoyme et al. pp. 68–73.
*ARINC Specification* p. 629.

*Primary Examiner*—Salvatore Cangialosi
(74) *Attorney, Agent, or Firm*—Venable; Norman N. Kunitz; Catherine M. Voorhees

(57) ABSTRACT

Proposed is a protocol for transmitting messages between transmitting and receiving stations in time slices for critical security applications, based on a synchronous arbitration, by means of which disturbances in the communications system (including communication subscribers) are ascertained reliably. The time slices are continuously allocated deterministically to a respective station in cycles. The time slices are respectively subdivided into a temporal transfer window for transmitting the message and an acknowledgement window following the transfer window; the receiving station transmits an objection signal (VETO signal) in the acknowledgement window only if a message is received erroneously, or not at all, to indicate a disturbance.

16 Claims, 6 Drawing Sheets

PROTOCOL FOR CRITICAL SECURITY APPLICATIONS

BACKGROUND OF THE INVENTION

Communications systems often operate in an environment whose disturbance potential cannot be defined precisely. This is especially the case for avionic and automotive applications, whose disturbance environment changes constantly. The communications systems [1] currently in use, which are not of a critical security nature, meet the following requirements for reliability:

It must be possible to detect communication errors.

The failure of one subscriber cannot debilitate the communications system.

The sequence of transmitter messages is retained upon reception.

It is highly probable that messages are transmitted timely.

At this time, motor vehicles contain components that administer individual critical security tasks and communicate with other components. The communication is not of a critical security nature. The focus of the research, in contrast, is components which together perform complex, critical security tasks under hard real-time conditions, so the communications system itself is of a critical security nature. Such applications impose further requirements on a communications system that can only be partially met by current systems:

The communications system must be fail-operational, that is, it must continue to perform its task regardless of any possible disturbance or possible failure. In other words, redundant communications paths must be supported.

The communications system must reliably distinguish between permanent disturbance errors, and exclude defective components—and only defective components.

Changes in the communications system (failure and restart) must be reported to the application as quickly as possible and consistently over the network.

In the messages, distortions must be reliably recognized for the maximum duration of the disturbance.

Critical messages must be transmitted within a guaranteed time frame.

Multicast messages are necessary, and must be transmitted atomically. The retention of the global sequence of certain messages from various sources must be guaranteed.

It must be possible to perform a safety verification, in which it must be precluded that the communications system can negatively impact safety functions in the individual components. If components must collectively perform a critical security task, a safety verification must be performed for the communications system, including all components.

In addition to reliability and safety requirements, communications systems are also subject to the following requirements in practice:

It is crucial that stations and functions be integrated easily into a total system. The individual stations must be simple to configure.

Dynamic termination and inclusion of communication subscribers and the ability of the network to be expanded are other important features.

A future-oriented communications system must keep pace with advancements, and be able to be advanced. It should be suitable for high transmission speeds and be able to operate on different physical media. Conceivable application architectures, particularly for redundant operation, cannot be impeded or prevented.

Finally, the communications system must be cost-effective.

The protocol of a communications system is the system's "motor." Protocols can be roughly divided into two classes based on their access method: synchronous and asynchronous.

Asynchronous access methods have a short access time in the middle, which cannot, however, be guaranteed (or only for a specific message). The best-known protocols with asynchronous arbitration that have been developed for motor-vehicle use are CAN [2] and ABUS [3].

Synchronous access methods are more capable of assuring access. They operate according to three different fundamental principles: master/slave, token access and time-division multiple access (TDMA):

Simple master-slave protocols, such as the MIL standard protocol 1553B [12] developed for the field of military aircraft and vehicles, rely on the capability of their master, and fail in the event of an error. In other multi-master protocols, the master property can also be transferred to other network stations in the event of an error, but, in such a case, the flow of messages is interrupted and not deterministic.

Protocols operating according to the token principle, such as the token-bus protocol [9] and its variations, are also not strictly deterministic in cases of errors (timing problems in identifying token loss and matching in the new generation process), or, as in the token-ring protocol [10], an active communication path is required, which is a difficult and costly demand to meet.

TDMA-based protocols can be designed so as to operate deterministically, even in the event of an error.

Standardized protocols are often combinations of the above fundamental principles.

Hence, the TCN protocols [4] MVB and WBT are used, for example, in the railway industry. They include an alternating central master control, but otherwise function according to the TDMA principle. A non-deterministic TDMA protocol in which the subscribers are dynamically allocated time slices during operation is the protocol according to U.S. Pat. No. 4,161,786 [14]. The protocol ARINC 629 (MTDB) [13], which was developed for the field of aviation, is a TDMA protocol controlled by local clocks, but monitors the bus to prevent collisions and only operates deterministically if all subscribers abide by their time limit. The protocol ARINC 659 (SAFEbus) [7] provides a strict TDMA arbitration. It was likewise developed for reliable aviation systems, but requires a complex and costly physical embodiment, and, as a back-plane bus, is too short (42 inches) for spatially-distributed applications.

SUMMARY OF THE INVENTION

This application introduces a protocol that is based on a pure, distributed and strictly-deterministic TDMA arbitration. The protocol takes into consideration the aforementioned requirements, is extremely robust with respect to short, sustained and periodic disturbances, and encompasses all justifiable options of maintaining communication. It presupposes a synchronous, distributed time base that can be realized with continuous messages [5] and by local clocks [6]. The protocol is not biased toward any particular software architecture for the application. It is compatible with combinations ranging from redundant, critical security stations to non-critical, and simple stations, with less-stringent to hard real-time requirements. In addition to the recurring themes of error tolerance and reliability, aspects such as practicality, costs and advancement were of prime consideration in the development of the protocol.

For critical security systems, static (pre-runtime) scheduling of application processes is advantageous because they are easier to verify. An obvious concept lies in the synchronization of protocol and application, which results in a time-controlled architecture. In such a time-triggered architecture (TTA), a single global time clock, which can be realized in distributed form, controls all system activities: user functions and communication. In such an architecture, information can flow as follows: A message is produced in a predetermined time slice, transmitted and received in the subsequent time slice and further processed (delivery delay minimal, delay jitter=0) in the receiver station during the next time slice. The present protocol and the time-triggered protocol [8], also provided for applications in a motor vehicle, can be components of such a continuously time-controlled architecture.

Continuously time-controlled architectures and their static activity allocations are extremely advantageous, particularly with respect to the simplification of the safety verification and the synchronization of redundant stations. They are, however, also associated with several problems:

If, during transport, for example, messages are disturbed or lost, there is no time for a re-transmission. The TTP protocol provides the termination of relevant stations in such a case.

Because the time response of each component must match that of the entire system, costs and outlay become problematic if a time-controlled architecture is to be applied to a system or product having numerous variations, rather than a specialized product. Different configurations of the same component exist for both different vehicle types and different equipment variations. This necessitates a configuration management in the construction of a motor vehicle and later installation and exchange of components.

Time-controlled systems that execute so-called mode changes during transitions between flight phases are used in the fields of aviation and aerospace. Different modes, that is, different allocations of transmission rights, are necessary in time-controlled systems if a system must be adapted to a changed situation. Mode changes are therefore provided in the present protocol. Executing a mode change in the case of a disturbance, however, causes considerable problems with respect to consistency and real-time processing, even if the modes are severely limited and no random modes are permitted. They can, therefore, only be executed in a disturbance-free case. In addition, each mode of each component must be carried along by each component, even if the component itself requires no different modes. This means that each component must, in principle, perform its task in each mode. The internal temporal processes must conform to the modes.

To summarize: The protocol should not compel a general synchronization with the application; it should, however, permit synchronization so that parts of the application can operate with simultaneous time control, protocol-synchronized time control and result control. A time-controlled and also protocol-synchronized software architecture can be practical for a reliable and readily-available motor-vehicle base system comprising, for example, a redundant driver station and four wheel-module stations. All other parts can operate with result control. Mode changes, that is, jumps in different time-slice allocations, during operation should not constitute normal procedure.

It is the primary object of the invention to provide a protocol for transmitting messages between transmitting and receiving stations for critical security applications, based on a global time-slice allocation, with which disturbances in the communications system are reliably and consistently recognized, and disturbed communication subscribers are reliably and consistently ascertained and eliminated. In accordance with the invention, this object is accomplished by the features characterized in the claims.

The function of the protocol is independent of the application, and its course cannot be influenced by the latter. The protocol provides each station with a certain degree of transmission capacity per time unit. As long as the application localized there requests transfer services within these limits, a maximum transmission time can be guaranteed under given disturbance conditions. No special configuration of the protocol is necessary due to the independence from the application. The coordinates of the different suppliers of station modules with respect to the protocol are limited to the use of a matched, unambiguous station address and the access information.

The protocol is based on the TDMA (Time-Division Multiple Access) method. In the TDMA method, the time is divided into time slices, which are maintained largely synchronously in all stations. At least one time slice is statically allocated to each station in a TDMA cycle. Within its time slice, the station is exclusively authorized to transmit on the common communication medium. This method is efficient if, as in our case, the number of communication subscribers and the lengths of the messages are likely to be small. In addition to the transmission rate of the hardware, which must be economically justifiable, both of these parameters are decisive for the access time.

A significant advantage of TDMA is deterministic access. A total blockade of the communications system is precluded by principle. In the case of no errors, a maximum duration for the transmission of messages can be guaranteed for each station if the station abides by its authorized limit. To ensure a maximum duration for message transport even with disturbances and failures, the simple TDMA method must be expanded for the protocol.

The higher the transmission speed on a communication line, the more likely a disturbance is to occur. The possible disturbances to which a motor vehicle is exposed and which are caused by devices in the motor vehicle itself must be overcome either structurally or by the protocol. These include, on the one hand, stochastic as well as burst-type disturbances that are caused by external influences or originate from internal switching processes. On the other hand, there are other periodic disturbances, which are caused by internal or neighboring sources and can have particularly negative effects on the course of a periodic protocol. Examples include disturbances due to the ignition and generator, whose period also changes as a function of the rpm. If such disturbances occur even only temporarily—which can be the case due to production errors, aging errors or maintenance errors at disturbance-eliminating components—a certain rpm can have a fatal effect on a strictly-periodic TDMA protocol.

The following marginal conditions apply:
    The topology of the communications system:
        A bit-serial bus is used whose maximum length is in about the 100-m range and which can be redundantly provided. The subscriber stations are connected by means of transceivers to the bus line—e.g. a (shielded) two-wire line—so as to rule out a communication blockage by a permanent hardware error of an individual station.

Requirements for the communication subscribers:
The subscriber stations possess an error-avoidance device, which ensures that a transmission attempt outside of the station's time interval is intercepted. Stations are furthermore in a position to generate special signals (VETO) that can very likely be identified, even under heavy disturbance influences. Because VETO signals cannot transmit any information other than their presence, they can be realized as dominant signal levels or fed-back bidirectional signals. The signals should, however, have such a distinct appearance that the receiver only rarely interprets a disturbance as a VETO signal.

The lengths of messages, messages per time unit:
The necessary message length of the applications is anticipated to be between a few bytes and a few tens of bytes. If future data-intensive applications, such as route guidance, are to be operated with this communications system, the use of high-speed hardware will be essential.

The number of communication subscribers:
Depending on the task, vehicle applications require
extremely-frequent, periodic bus access, e.g. control subsystem;
frequent, periodic bus access, e.g. brakes subsystem;
or less-frequent (periodic) access with fewer time requirements.
The necessary access times of the subscribers are therefore varied, and in the hardest case, are expected to be about 1 ms. The maximum number of stations that require more or less hard real-time transport conditions is limited to about 32 in the aforementioned useful data quantities and at today's conventional transport speeds (1 to 10 MBits/s). In addition, further stations that require fewer real-time guarantees operate in the same network.

Quality of the message transport (transport duration, loss, doubling, sequence):
The transport duration of the message is guaranteed. If a message is lost, the application is notified directly and immediately. Doubling and transposition of message sequences are precluded.

Type of connection (synchronous, asynchronous), communication relationships (1 to 1, 1 to n):
For reasons of system consistency (all stations receive a command or status message simultaneously) and system expansion capability, messages are broadcast, which precludes connection-oriented functioning. The protocol controller operates independently of the application; in other words, the user messages are either transmitted synchronously, and must wait, or asynchronously, without waiting, via queues or at pre-planned times. If no message is present, the protocol controller acts according to its own needs.

The type and frequency of environmental disturbances:
The protocol is intended to operate reliably in severely-disturbed environments with frequent as well as periodically-occurring transmission errors that can last in burst fashion from time to time. Therefore, permanent errors of the communication hardware are recognized and the relevant subscriber is terminated. Transient disturbances do not lead to the termination of a station. A station can be re-incorporated into the running protocol.

Tolerable disturbances into the environment from the communications system:
In the use of encapsulated stations and shielded bus lines, disturbances into the environment due to communication, as well as disturbances from the environment, can be greatly reduced. The protocol includes no measures for this.

The invention is described below by way of an example in a short introduction of the protocol. A detailed description, protocol states and rules are illustrated in the subsequent sections.

DETAILED DESCRIPTION OF THE PREFERRED EMBODIMENTS

The TDMA arbitration method is expanded for the communications protocol under the silence is consent philosophy. In this case, the time slices of each station are divided into two time intervals, a transfer window and a short, subsequent acknowledgement window. If there is "silence" in the acknowledgement window, the preceding transmission is regarded as being accepted.

Figure 1:
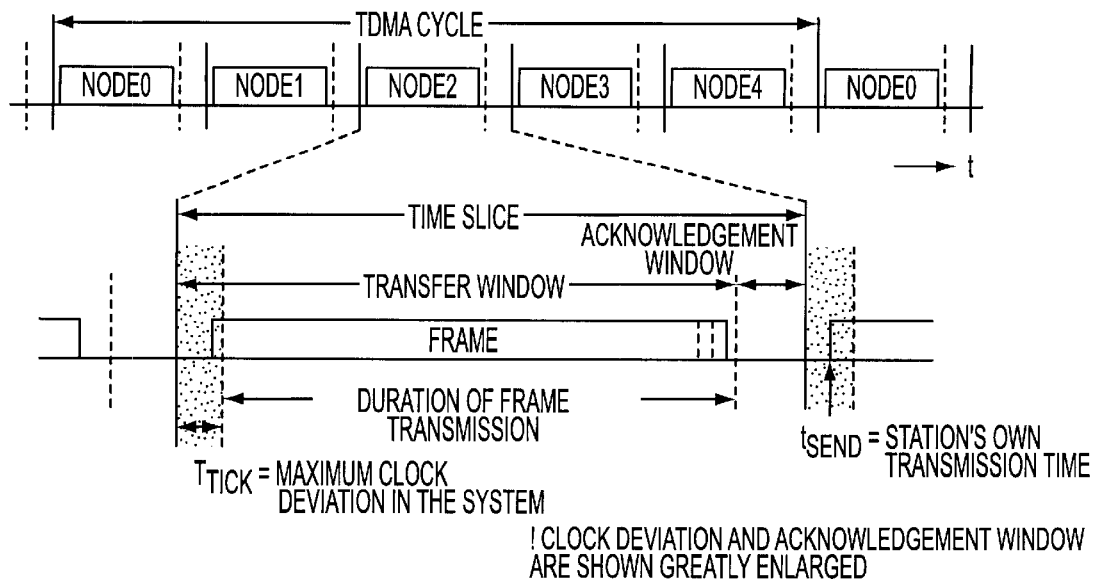
FIG. 1 depicts undisturbed operation.

FIG. 1 shows a fundamental representation of the time slices divided into a transfer window and an acknowledgement window, in undisturbed operation.

From a superficial viewpoint, transmission capacity is granted by the establishment of the acknowledgement window, even if it only lasts for a few-bit transmission times. It must be kept in mind here that, following the reception of a transmission, each real protocol controller requires a certain amount of time to check the message, transfer it to the application and prepare its own, subsequent transmission. Thus, even if a few functions can be made parallel, a pause occurs between two transmissions. With efficient planning by the protocol controller, the protocol control, transfer and preparation can be executed during the acknowledgement window.

An advantage of the acknowledgement window is its position between the transmission windows, which does not allow disturbances that are in effect for less than the width of the acknowledgement window to disturb two consecutive transmissions. Therefore, the acknowledgement window should be at least as wide as the duration of the more frequent disturbances.

In the converse case, silence is consent has the following meaning: If a station discovers a disturbance, it objects in the form of a VETO signal in the acknowledgement window. This signal is the basis of the overall consistency in the total system. In the event that the transmitting station or a station that has correctly received a transmission recognizes a VETO—in rare cases, a coupling-in of a disturbance is misinterpreted as a VETO—the station likewise transmits VETO on all (redundant) communication channels. This procedure is intended to increase the probability that all stations will recognize VETO; it also serves to assure consistency in a system with single-channel stations or stations having a defective channel. VETO signals are transmitted shortly before the new time slice is attained.

Figure 2:
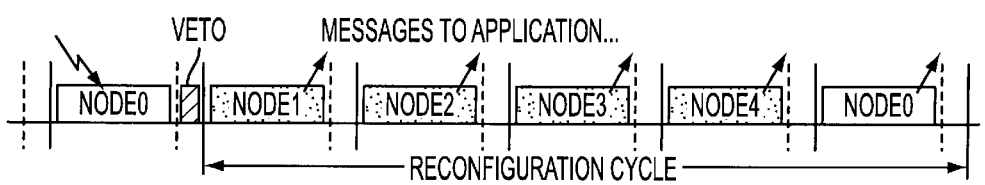
FIG. 2 shows individual disturbance (transmission error or disturbance).
Figure 3:
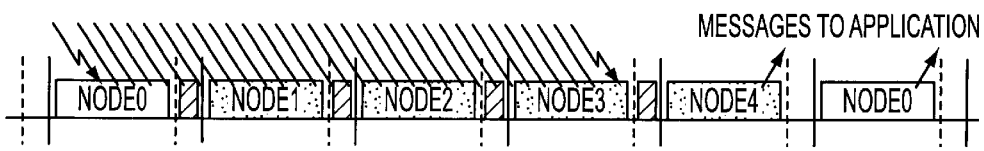
FIG. 3 illustrates sustained disturbance (burst disturbance).

Following a disturbance, a reconfiguration cycle is run. It serves to determine the exact cause of the error and, possibly, to localize and terminate a defective station. In the cycle, special message frames are transmitted (gray shading in the figure), but these also contain user messages. An incorrect reception in the cycle is likewise designated by VETO. If the error is on the part of the transmitter (FIG. 2) or is a disturbance that decays during the cycle (FIGS. 3 and 4), the user messages contained in the transmissions are conducted further.

Figure 4:
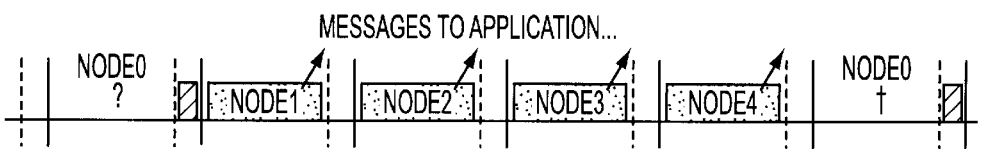
FIG. 4 depicts station failure (or permanent transmission error).

At the end of the reconfiguration cycle, normal operation is re-established. A failed station or a station having a permanent error in the transmission or reception channel would be terminated at the latest after the re-transmission in the initially-disturbed time slice (FIG. 4: time slice of node 0). Each station locally maintains a system-state vector by continuously entering the current state of the partner stations. This membership information is also consistently available to the application at all times.

In a TDMA cycle, each station that transmits messages possesses at least one time slice in which it is authorized to transmit. Because all stations are not to be treated as having identical authorization, in view of the above statement, a time-slice allocation that is adapted to the problem can be selected in the TDMA cycle. Hence, stations that require shorter access times or have larger quantities of information to transmit possess two or more time slices in the TDMA cycle. The following example is of a time-slice allocation preferred for a motor-vehicle base system (0, 1 redundant driver station, 2 . . . 5 wheel modules), and provides calculation time following the communication, during which other stations (6, 7, 8, 9) transmit:

. . . 3 9 | 0 1 6 2 3 4 5 7 1 0 8 4 5 2 3 9 | 0 1 6 . . .

The time-slice allocation must, however, be globally and consistently known in the communications system. It is assumed hereinafter to be statically predetermined. If very long burst disturbances are anticipated, a plurality of station cycles can be combined into a total cycle. This simultaneously increases the reconfiguration cycle in that a sustained disturbance is treated as an individual disturbance. To prevent a particular station from being constantly disturbed by periodic disturbances, and therefore terminated, the sequence of stations is rearranged in the aforementioned partial cycles.

In the expansion of the concept of adapting communication, it is desirable to have numerous different TDMA cycles available in the system. This brings up the problem of cycle change (mode change). If mode changes are permitted, it must be kept in mind that a bus guardian—a hardware device that is independent of the protocol controller and ensures that transmission attempts outside of the station's assigned time interval are intercepted—becomes more complex out of necessity.

The user consistently makes the cycle information available, and establishes it statically. Mode changes become effective upon request by the application of a station if the new cycle is initiated by its application software in all of the other active stations, and they therefore register no VETO. The new TDMA cycle begins after the current cycle is complete.

To preclude a failure of the entire communications system by a blockade of the communication channel (individual errors: short circuits, disconnections, terminal resistance contact error), the protocol controller should include two communication channels. In the event of a permanent error of a communication channel (bus line and/or transceiver), communication can be fully maintained, and the motor vehicle remains capable of operating, with a redundant design. If all of the parts are functioning properly, the probability that a disturbance will occur due to double transmission is (slightly) reduced. This, however, has little impact on the protocol, because even with a sudden failure of a channel, operation absolutely must be assured when disturbances occur. (Whenever possible, motor vehicles must be able to continue traveling—possibly at lower speeds.) Through local disconnection of the connections and an alternative wiring of the bus lines, a mechanical or terminal common-mode error that affects both channels can be extensively precluded.

a) In a normal case, a station transmits message frames and possibly VETO signals simultaneously on both channels. A message is first considered successfully transmitted if a station correctly receives at least one of the redundant messages, regardless from which line. If VETO is subsequently recognized on one of the two lines—another station has not received correctly—the transmission is considered a failure.

b) Simultaneous operation of stations that operate both lines of a redundant bus, and those that operate only one line (as dictated by failure) is permissible.

With the use of a self-clocking code in the physical transmission, change bits cannot be inserted (bit stuffing) in a transmission if an end marker of the transmission is not necessary. With variable message lengths, it is possible either to assure the end marking through silence on the line (interframe spacing) or to also transmit a length specification at the beginning of the transmission, which must then, however, be evaluated by the receiving hardware. As in bit stuffing, the component of useful information is reduced. A time-controlled protocol can also make use of the fact that the length and transmission time of all messages are known at the "compile time" of the total system.

An inevitable disadvantage of variable message lengths is that both the protocol controller and the aforementioned bus guardian become more complex. The simplest method lies in transmitting messages of constant length, causing all time slices to have the same length.

The message frames, referred to hereinafter as frames, comprise the following fields:

| Protocol byte | | | | | | | | | | | |
|---|---|---|---|---|---|---|---|---|---|---|---|
| Preamble/Start | F | E C | N S | G | M | I | x | y | Message | CRC |

Preamble/Start delimiter: Serves to synchronize the receivers.

F Frame type: normal frame, recovery frame

E Error bit in the recovery frame: set when a transmission error has occurred.

N No frame in the recovery frame: set when no frame has been received.

C Cycle number in the normal frame: All active stations transmit the number of the current TDMA cycle (mode) over the cycle bit in the normal frames of the consecutive time slices. A sequence comprises a series of normal frames that have a set cycle bit and are limited by normal frames having a canceled cycle bit. The sum of the frames having a set cycle bit yields the number of the cycle. An example:

Cycle bit(N frame$_{slice}$)$_{slice=n,\ n+1,\ n+\ldots\ 2}$: { ... 010 ... } ≈ Cycle 1

Knowledge of the current cycle number is necessary if a station that has recently been started up seeks to be integrated into the running protocol operation. A disturbance makes the transmission invalid.

S Slice number in the normal frame: Via the slice bit in its normal frames, a station continuously transmits the number of the time slice in which it presently transmits, and thus implicitly—with knowledge of the current cycle number—its own station address. A sequence comprises a series of normal frames that have a set slice bit and are limited by normal frames having a canceled slice bit. The sum of the frames having a set slice bit yields the number of the time slice. An example:

Slice bit (N frame$_{slice,\ cycle}$)$_{slice=const/cycle=i,\ i+1,\ i+2\ \ldots}$: { ... 0110 ... } ≈ Slice 2

Knowledge of the time-slice number is necessary if a station that has recently been started up seeks to be integrated into the protocol operation, and must establish its own time slice. A disturbance makes the transmission invalid.

G Group station (ignore cycle/slice bits): set by stations that share a time slice or set up to the end of the current cycle, depending on the request for a mode change.

M Message type: Application message or protocol message (NULL, INIT, RUN, CHANGECYCLE, INTEGRATE). Protocol messages are transmitted during initialization, inclusion and operation (NULL if no user message is present).

I Input error: Set if one of the communication channels of the transmitting station is permanently defective or disturbed.

x, y free (possibly, parity over protocol bytes)

Message:
   This field contains user messages, which can be of varying lengths. Because the transmitter and message type must be established unambiguously with the time slice in a time-controlled architecture, the application can omit a type identification in the message. For protocol messages, this field contains the type, the number of the current cycle, the current time slice in the cycle, the station-guided state vector of the communications system and a check sum for the cycle information.

CRC:
   The cyclic redundancy check covers the protocol byte and the message field. It is generated and attached during transmission, and generated and compared during reception. To assure reliable error recognition, the CRC should have at least one bit length that corresponds to the length of the disturbances that (commonly) occur in practice.

Figure 5:
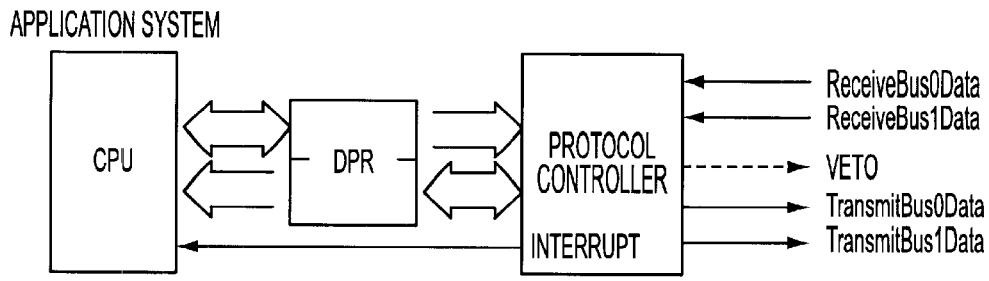
FIG. 5 shows the protocol controller connections.

FIG. 5 illustrates the principle of the connection scheme of the protocol controller.

The exchange of messages, commands and information between the user CPU and the protocol controller can be effected, for example, by way of a dual-port RAM (DPR), which is to be divided into two parts. In the first part, only the user CPU is write-authorized, while in the second part only the protocol controller is write-authorized. The application therefore cannot intervene in the course of the protocol.

On the network side, the protocol controller has two serial inputs and outputs, respectively, for directly connecting two transceivers. The protocol controller has no knowledge of whether redundant bus lines are actually connected, but operates according to this presupposition. If only one transceiver and bus are connected, or one channel is defective, the course of the protocol does not change; only the probability that a disturbance will become effective increases. Whether a veto line is necessary or VETO is sent as a special signal on the transmit line depends on the realization of the veto signal. For reasons of error disclosure, it is better to send VETO over the transmit line, because the ability of the veto devices to function cannot be tested during operation. If two transceivers are provided, the line goes to both of them.

Figure 6:
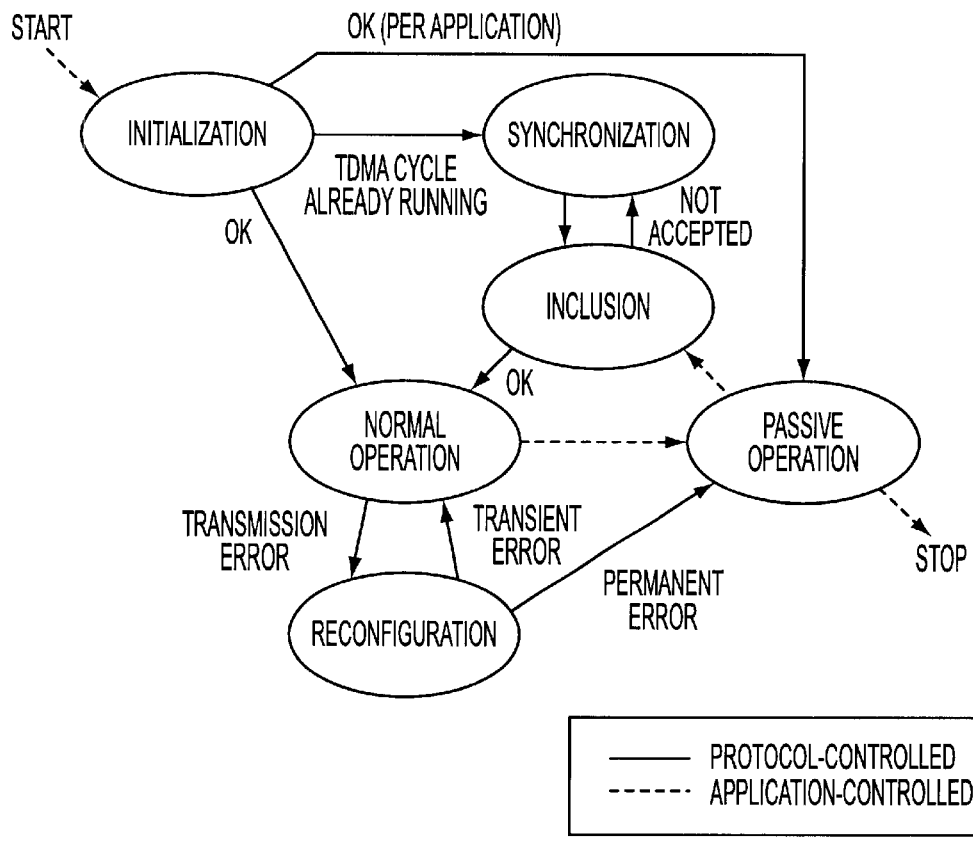
FIG. 6 is a state diagram of the protocol controller.

The protocol controller operates according to the state diagram shown in FIG. 6.

After switch-on, and according to requests by the user software, the protocol controller enters initialization. In initialization, other communication subscribers are addressed and a TDMA cycle is formed. Subsequently, the protocol controller changes over to normal operation or, if desired by the application, to passive operation. Passive operation allows the application to listen in on messages; the protocol controller is, however, not authorized to transmit. If a cycle has already been formed by other stations, the protocol controller changes over from initialization into normal operation, bypassing the states of synchronization and inclusion. The change from passive operation to normal operation can also be effected per the application through inclusion. A transmission error shifts the protocol controller from normal operation into the reconfiguration state. A reconfiguration cycle is run in that it is assessed whether a permanent error is present. The protocol controller changes over to passive operation if it is affected by such an error. Following error statistics and successful self-testing, a new attempt at inclusion can be made, or the controller can be shut off.

The following verbal specification includes explanations and rules for implementing the protocol controller. The rules are partially supplemented by time charts that symbolize the resulting behavior of the total communications system with respect to the rules. The term "station" is used synonymously with "protocol controller."

The following basic rules are generally applicable:

Rule 1

Each station obtains a numerical address <<i>> hit that identifies it unambiguously, and cycle information that is consistent with all stations. The cycle information includes at least one TDMA cycle, but generally includes a plurality of cycles. A cycle comprises a series of time slices, which are allocated to certain stations <<i>>. Numerous time slices can be allocated to a station <<i>> in one cycle. A station <<i>> in the current cycle <<c>> is authorized to transmit in all time slices of the number <<s>> with owner(c,s)=i; in the case of owner(c,s)≠i, the station is not allowed to transmit.

Rule 2

The stations possess at least two communication channels (transceivers), which are connected via separate bus lines, so the total system can continue to operate (remains fail-operational) if one bus fails.

Rule 3

A transmission error is present if no frame was received by a receiver in a time slice, or no frame was received correctly (framing error, transfer code error, crc error). If one correct frame is received, the transmission is considered successful. Stations that have recognized a transmission error basically transmit VETO in the following acknowledgement window. A station essentially selects both channels when transmitting VETO. Consequently, with redundant connection, VETO is transmitted on both lines.

Rule 4

A station that recognizes VETO in the acknowledgment window (regardless on which channel) likewise transmits VETO on both channels until the end of the acknowledgment window (even if the station has received a correct frame). This assures consistency with single-channel stations and stations having a defective channel. For this reason, the acknowledgement window is at least twice as long as the duration for recognizing the VETO signal. (It is, however, also at least as long as the frequently-occurring disturbances.)

Rule 5

Each station maintains a system-state vector in which the state of all stations is held at the last state. Stations are set to be excluded or included in the vector.

Rule 6

If a station receives correct messages on one channel and more than half of the included stations receive no correct frames on the other channel, the station sets the channel as undefined. A bus interruption or a short-circuit is suspected. The station sets the channel as ok as soon as more than half of the stations (again) receive correctly on the channel.

Rule 7

If one of the channels is set as undefined, all of its frames are transmitted with a set input-error bit in the protocol byte, so the defect becomes apparent to all stations. The information can be queried by the application.

Rule 8

The protocol controller obtains a user message as soon as it attains its time slice, or it generates a NULL protocol message if no message is present. Protocol messages include the number of the current cycle, the position of the current time slice in the cycle, the current system-state vector and a suitable check sum over the cycles.

Rule 9

If user messages are contained in a correctly-received frame, they are transferred after the acknowledgement window has passed, as requested by the application, even if the transfer was invalidated by VETO (RECV_VETOMSG). Protocol messages are also transferred if requested (RECV_PROTMSG).

Rule 10

If two correct frames are received and one of the channels is set as undefined, the message of the ok input is evaluated and, if the application requests only one message, the message is forwarded further. This occurs because the probability of an unrecognized transmission error is increased.

The following measures are decisive for the probability of consistency in the system.

Rule 11

VETO signals (and their hardware) are to be implemented such that they are very likely to be recognized, even under severe disturbance conditions. It is tolerable for the recognition hardware to interpret and announce individual disturbances as VETO, which is then made known globally according to Rule 4. It is not permissible for a VETO signal not to be recognized because of a possible disturbance.

Rule 12

VETO is recognized by the receiving hardware because a separate recognition device cannot be checked during operation. Furthermore, the case that a (single-channel) station correctly receives a frame, but does not recognize a subsequent VETO signal, is highly unlikely, and can be caused solely by a transient error. A permanent error would disturb both functions, namely frame reception and veto recognition.

The following protocol rules apply for normal operation:

Rule 13

Figure 7:
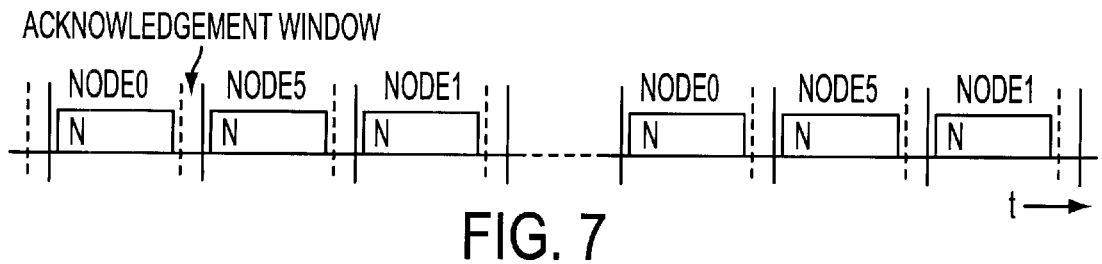
FIG. 7 illustrates the protocol course in undisturbed operation.

In normal operation, all active stations transmit normal frames (N) in their time windows. (Refer to Rule 8.) Normal operation exists as long as all active receivers correctly receive (at least) one normal frame in the time windows of transmitters marked as included. FIG. 7 shows the course of the protocol in undisturbed operation.

Rule 14

Figure 8:
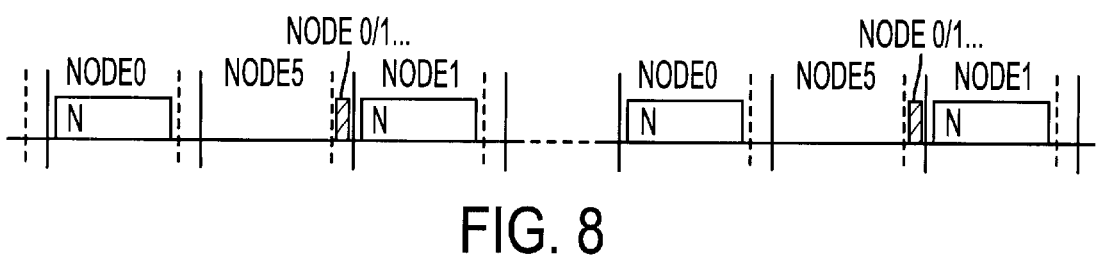
FIG. 8 depicts the protocol course in an inactive station (Node 5).

According to Rule 3, VETO is transmitted in the acknowledgement window of an excluded station. In this case, normal operation is continued by all stations. FIG. 8 shows the course of the protocol in an inactive station.

Rule 15

The included stations continuously transmit the number of the current cycle over the cycle bit in the protocol byte. The first station begins with a 0 in the cycle bit; its successors then transmit 1 consecutively until the number of the cycle has been attained. Afterward, the next station again transmits a 0, etc.—refer to Rule 26a (counterpart). When normal operation ends, or after a protocol message has been transmitted, the mechanism is reset until it again initiates the first, undisturbed normal frame (which logically contains a 0 in the cycle bit).

Rule 16

A station transmits the number of the current time slice (and, hence, implicitly, its station address) over the slice bit in the normal frame in its time slice(s). The station begins with a 0 in the slice bit, and afterward transmits a 1 in the same time slice until the number of the time slice has been attained. The station then starts from the beginning. Counterpart: Rule 26b. When normal operation ends, or after the transmission of a protocol message, the mechanism is reset until it again initiates the first, undisturbed normal frame of the station.

If the frames of an included transmitter that are transmitted in the state of normal operation are only disturbed by at least one receiver, or were not received at all, all stations run a reconfiguration cycle. The following are considered as causes of such a disturbance:
1. Coupling in,
2. Totally-failed station,
3. Station(s) having a defective receiving channel(s),
4. Station having a defective transmitting channel,
5. Separation or short-circuit of the bus line(s) that manifests itself in the form of a station(s) having a total failure, and/or in the form of a station(s) having a defective receiving channel.

The reconfiguration should eliminate permanent sources of disturbance, but, in the case of transient disturbances, should not erroneously terminate any stations. In Cases 1 through 4, an unambiguous determination of the cause is possible—in other words, the decision of whether and which station must be terminated can be made unequivocally and correctly. Under the required real-time conditions, such a correct decision—if there is one—cannot be guaranteed in Case 5. It is possible, however, to reduce the probability of occurrence toward zero for Case 5 through the use of redundant bus lines and maintenance (as a reaction to the display integrated into the protocol according to Rule 7).

Only recovery frames whose error bit contains a portion of the information needed for determining causes are transmitted in the reconfiguration cycle. Three station variables are relevant for the reconfiguration:

Using the error bit in the recovery frame, the station informs all other stations of whether it has received the two frames of the initially-disturbed transmitter incorrectly or not at all.

In the variable ReceiveOneOK, the station notes whether it has correctly received at least one frame from another station in the reconfiguration cycle.

In the variable OtherDisturbed, the station notes whether at least one other station has (also) incorrectly received the two frames of the initially-disturbed transmitter.

The stations reach their decision after the end of the reconfiguration cycle. The receivers that have received the frame of the initially-disturbed transmitter, which re-transmits following the reconfiguration cycle, are involved in the decision. The stations that have not received a correct frame from any transmitter, or were the only station affected by the repeatedly-disturbed transmitter frame, are excluded from these stations. All other receivers involved in the decision-making signal the exclusion of the initially-disturbed transmitter by transmitting the VETO signal.

Figure 9:
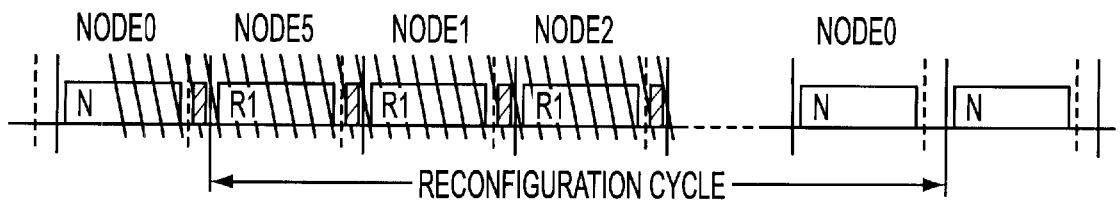
FIG. 9 shows sustained disturbance in the reconfiguration cycle.

Rule 17
If a station in normal operation ascertains that VETO was transmitted in the acknowledgement window of a station that is set as included in the system-state vector, the station subsequently runs a reconfiguration cycle. (Essentially no mode-change and integration messages are transmitted in the reconfiguration cycle.)
a1 At the beginning of the reconfiguration cycle, all receivers that ascertained a transmission error in the previous transmission set their variables as follows:
  Error=TRUE,
  ReceiveOneOK=FALSE,
  OtherDisturbed=FALSE.
a2 Receivers that have received a correct normal frame set their variables as follows:
  Error=FALSE,
  ReceiveOneOK=TRUE,
  OtherDisturbed=TRUE.
b1 In the reconfiguration cycle, all included receivers transmit a recovery frame having the value of the previously-set error variables in the error bit (refer to Rules 8 and 9) in the respective receiver time slice(s). The initially-disturbed transmitter transmits normal frames (N) if it possess numerous time slices in the cycle. Stations that note a transmission error in the cycle transmit VETO (as established in Rule 3), so the global view is assured in the delivery of messages to the application.
b2 When a frame is received correctly—even if it was invalidated by VETO—the receivers set their variables as follows:
  ReceiveOneOK=TRUE (a frame from another station was received correctly) and, if the error bit in the recovery frame is set as TRUE,
  OtherDisturbed=TRUE (another station was initially disturbed).
c If a normal frame (N) of the initially-disturbed transmitter that was transmitted in accordance with Rule 17b1 is not invalidated in the reconfiguration cycle, normal operation is immediately re-assumed. This scenario is illustrated in FIG. 9.
d At the end of the cycle, the initially-disturbed transmitter transmits a normal frame (N).
e If a receiver ascertains a transmission error following the reception of the N frame transmitted in accordance with Rule 17d, the receiver evaluates its variables as follows:
  e1 If the variable ReceiveOneOK is FALSE, the receiver cannot have received a frame correctly from another station, and terminates itself in accordance with Rule 18.
  e2 If the variable ReceiveOneOK is TRUE and the variable OtherDisturbed is FALSE, the receiver was the only subscriber to receive no correct messages from the transmitter. The receiver waits for the passage of the acknowledgement window. If VETO is initiated by another station, the receiver increments an error counter. If a value to be defined is not exceeded, the receiver remains in active operation. Otherwise, and if no VETO is initiated, the receiver is terminated in accordance with Rule 18.
  e3 If the variable ReceiveOneOK is TRUE and the variable OtherDisturbed is TRUE, the transmission is invalidated with VETO, with the transmitter being terminated in accordance with Rule 19.

Figure 10:
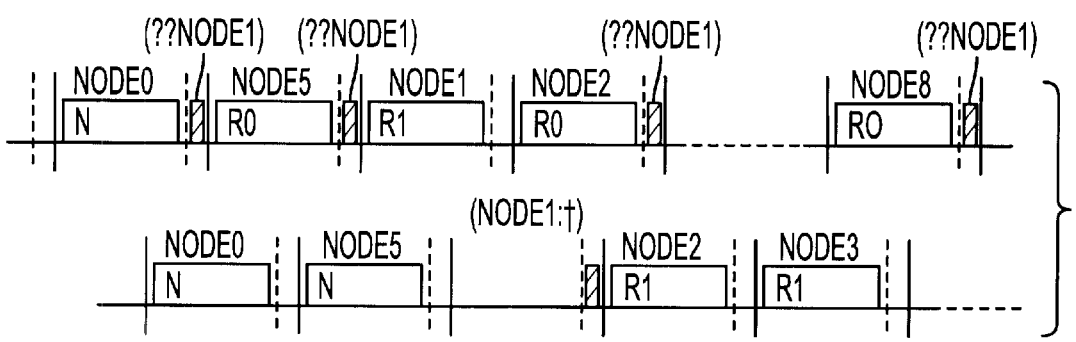
FIG. 10 illustrates the protocol course with a permanently-defective receiver—Node 1.

Rule 18
Termination of a receiver: In the case of Rule 17e1 or 17e2, the receiver sends a message (INTR_EXCLUDED) to the application and shifts immediately into passive operation. FIG. 10 shows the course of the protocol in a permanently-defective receiver.

Rule 19
Termination of a transmitter: In the case of invalidation in accordance with Rule 17e3, the transmitter is consistently terminated over the entire network. All active stations, including the transmitter itself, mark the disturbance field in the system-state vector as excluded.

Figure 11:
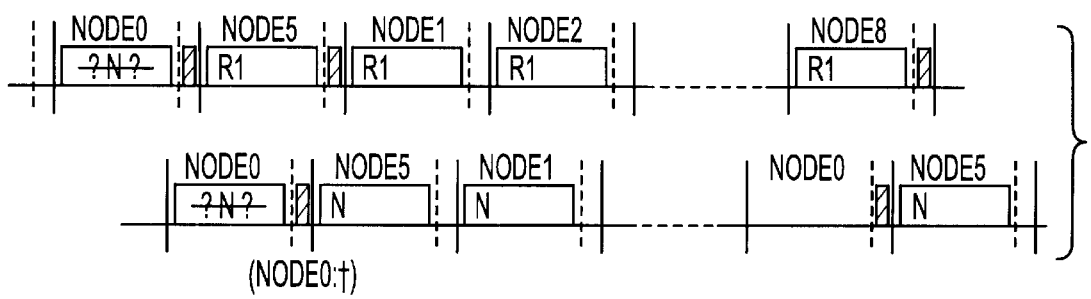
FIG. 11 depicts the protocol course with a permanently-defective transmitting channel: Node 0, the same course in a total failure of the transmitter: Node 0.

The application is informed of the termination of the transmitter (INTR_SYSCHANGE). The transmitter shifts into passive operation (INTR_EXCLUDED). Normal operation is continued in the next time slice. FIG. 11 shows the course of the protocol in a permanently-defective transmitter.

Note: During a disturbance that does not last beyond the reconfiguration cycle, the affected transmitter and all receivers remain active. If a disturbance lasts beyond the reconfiguration cycle, at least one station remains active: Either the transmitter or, with partial disturbances, at least one of the receivers.

Figure 12:
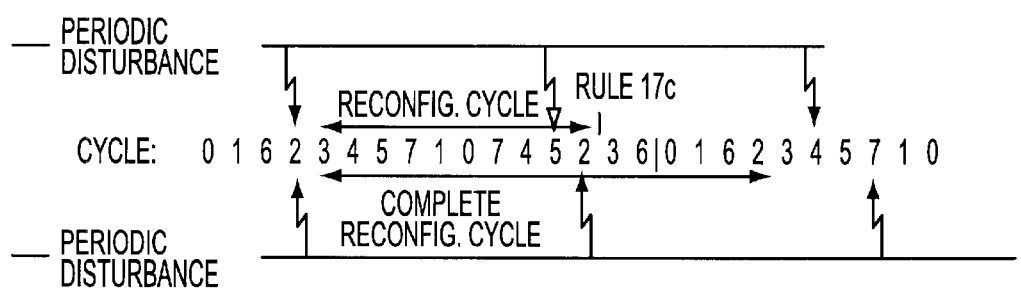
FIG. 12 shows how an asymmetrical cycle avoids terminations due to periodic disturbances.

Note: Rule 17c is suitable for avoiding terminations due to periodic disturbances if the stations are distributed advantageously in the cycle, provided that the disturbances are not too fast and affect every time slice; see FIG. 12.

When a station is requested to initialize, the following scenarios must be taken into account:

A TDMA cycle is already running: The station is shifting into the inclusion state.

The station is attempting to form a TDMA cycle by transmitting a first INIT frame. In this instance, the following cases must be distinguished:

Another station is also attempting to form a TDMA cycle.

Other stations are not responding (transmission error, collision, no station is active).

Other stations are accepting the attempt.

Figure 13:
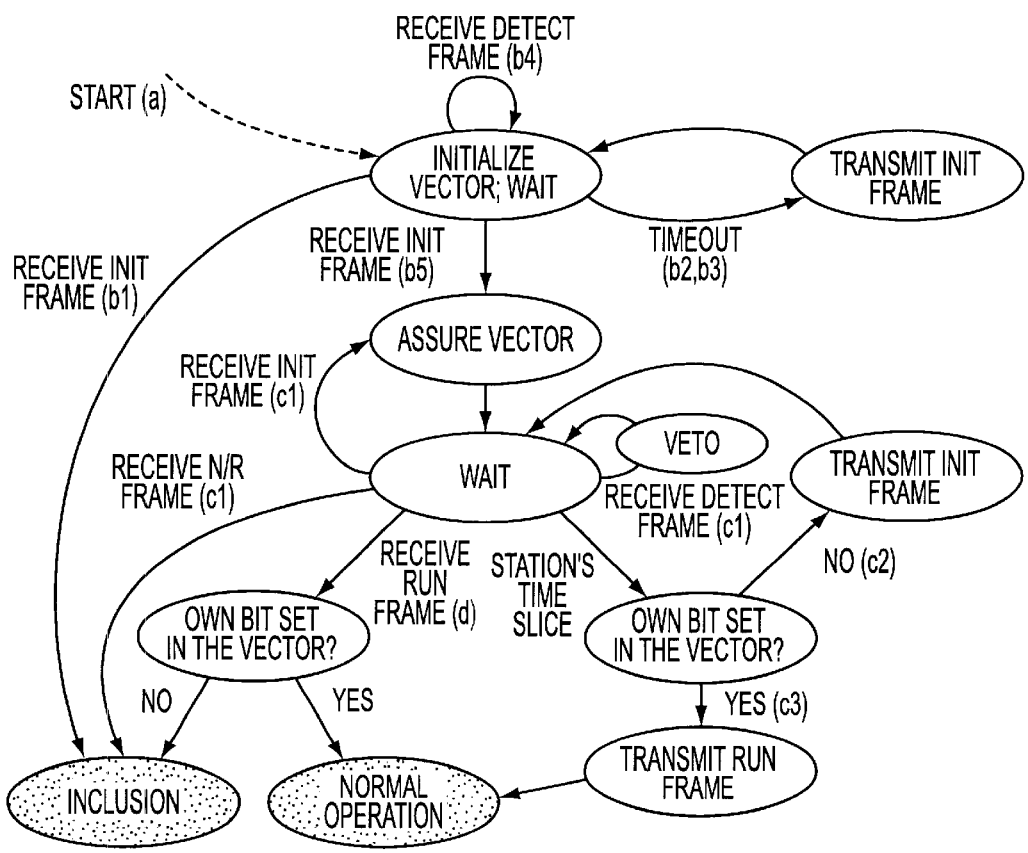
FIG. 13 is a state diagram of the initialization cycle.

The crude state diagram shown in FIG. 13 forms the basis of initialization.

Rule 20

At the beginning of initialization, the protocol controller loads the cycle 0. Each station named in the predetermined cycles should possess at least one time slice in which it is authorized to transmit.

a If the application requests a station to initialize, the station waits for a frame for a time span to be determined, which is intended to permit the start of all stations together. The time span is to be selected to be long enough that the different transit times are compensated in the initialization of the stations. The time span must be longer than the duration of the cycle in order not to disturb a running system.

b1 If, during the aforementioned time, a waiting station receives a correct frame that is not of the INIT protocol message type, the station shifts into the inclusion state.

b2 If the station has not received a frame following the expiration of the aforementioned time span, it transmits its own initial INIT message. The latter includes the cycle number=0; the starting time slice, that is, the first time slice in the cycle in which the transmitter is authorized to transmit; the initial system-state vector; and a check sum over the cycle information. In the initial state vector, the bits of all stations are set as excluded.

b3 If the station does not receive a frame of another station in its INIT message within a time span determined from <cycle duration+2·starting time slice·time-slice duration>, the station re-transmits its initial INIT message. This procedure is repeated. The number of repetitions must still be determined.

b4 If, at this time, a frame is received with disturbance, no VETO is transmitted and Rule b3 is followed again. The aforementioned waiting time is re-established.

b5 Following an external, correct INIT message, the included check sum is compared to the station's own check sum. If they match, the time slice is synchronized with the aid of the included time-slice number, and the protocol clocks are started. The time slice is stored as a starting time slice.

c1 Each time that an INIT message is subsequently received correctly, the included check sum and the time-slice number are compared to those of the station. In the event of a difference, the frame is invalidated if the station itself is already set as included. Otherwise, the included system-state vector is removed and stored locally by overwriting. Disturbed or invalidated frames are ignored. If non-INIT frames are received, the protocol shifts into the inclusion state.

c2 If a station enters its time slice, but is still characterized as excluded in the local (most-recently stored) system-state vector, or the starting time slice has not yet been reached again, the station copies the state vector into its INIT protocol message, sets its state bit there as included and transmits the frame.

c3 If a station is already included in its time slice and the starting time slice has been attained or overwritten, the station transmits a RUN protocol message and, if the message is not invalidated, shifts into normal operation (established cycle, time slice 0). The application is notified of the shift to normal operation.

d All stations that receive a RUN protocol message that is not invalidated likewise switch to normal operation if their bit is included in the system-state vector and their own message has been successfully received. If this is not the case, they enter the inclusion state. The application is notified of the shift to normal operation.

Figure 14:
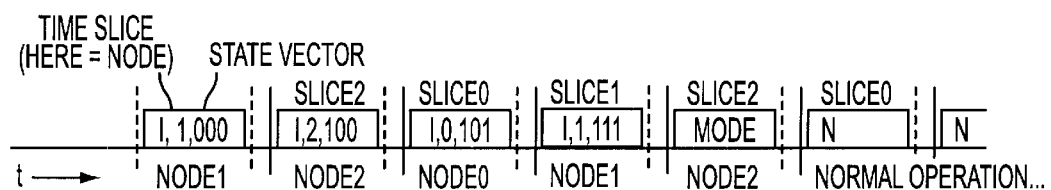
FIG. 14 illustrates the normal start of the protocol (3 stations in the cycle, Node 1 transmits first).
Figure 15:
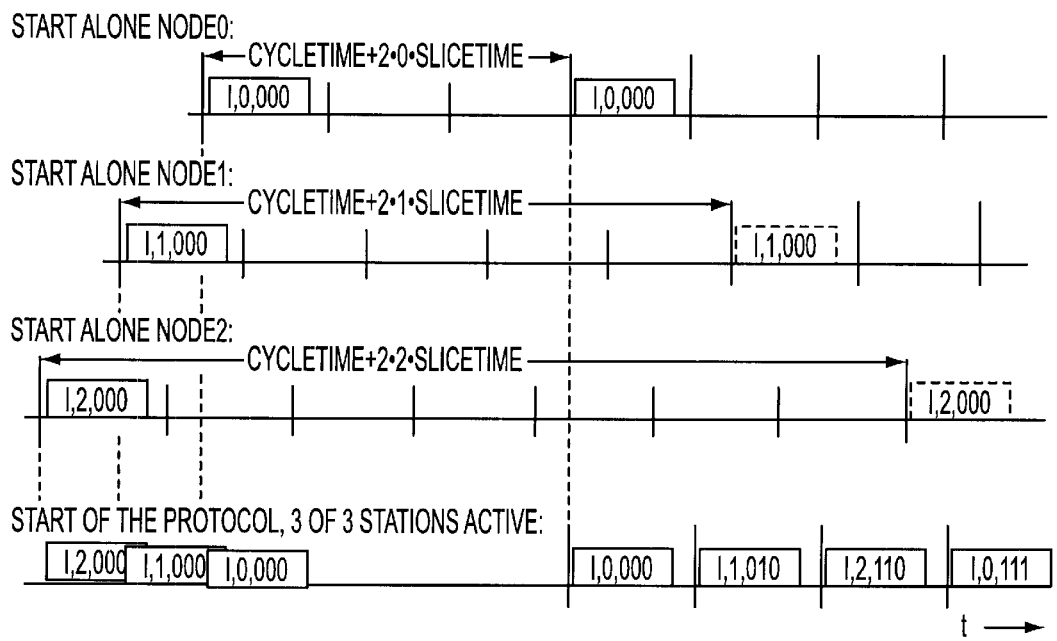
FIG. 15 shows the start of the protocol following a collision.

FIGS. 14 and 15 illustrate the starting process.

The application can start or switch the protocol controller into passive operation. Passive operation is a automatically adopted if a termination occurs at the end of the reconfiguration in accordance with Rule 18 or Rule 19.

The following rules relate to passive operation:

Rule 21

In passive operation, no messages and no VETO signals are transmitted. Messages from other stations are transferred to the application in accordance with Rule 9.

Rule 22

In normal operation, a station can be switched into passive operation in accordance with Rules 18, 19 and 33, or explicitly by the application. Passive operation becomes effective immediately. If a station enters passive operation, it sets itself as excluded in the local state vector.

Rule 23

Messages that are only received incorrectly by passive stations and are therefore not invalidated become lost. An affected station enters synchronization. The application receives an error message.

Rule 24

The application can effect a change from passive operation to normal operation through inclusion if the station possesses its own time slice in the current cycle. If this request is preceded by a protocol-controlled termination in accordance with Rule 18, it leads to the change in state only if the station has received no disturbed frames over a certain time period <<t>>, and the number of the station's own terminations per past time unit <<T>> has not exceeded a given threshold value (<<t>> and <<T>> must still be established).

The following rules relate to synchronization:

Rule 25

Stations in synchronization transmit no messages and no VETO signals.

Rule 26
   If a station is not protocol-synchronous, it must first learn of the current cycle and the number of the current time slice. The station must additionally determine the current system state. If the station receives a protocol message while executing this rule, Rule 27 applies directly.
a Determine the number of the current cycle (mode): The station consecutively evaluates the cycle bits of all normal frames that are not invalidated. If the station receives a disturbed frame that is not invalidated, or a recovery frame, it must begin the evaluation again. A sequence begins with a first 0 (initial marker) in the cycle bit, and is complete when a second 0 (end marker) is recognized. The cycle number results from the sum of directly-consecutive normal frames having a 1 in the cycle bit.
b Determine time slices: If the static cycle information is presupposed to be consistent with the system, the observing station can inspect individual time slices in the current cycle and evaluate the slice bits of the normal frames transmitted therein with the application message. A sequence is valid if the observed time slice is not disturbed—in other words, if normal frames are transmitted in sequence. The first completed 0 (initial marker)-to-0 (end marker) sequence reveals the number of the time slice resulting from the sum of directly-consecutive normal frames of the time slice having a 1 in the slice bit. With the aid of the time-slice number, the station address can be determined because of the globally-consistent cycle information. Thus, the station's own time slice(s) is (are) determined in the cycle. If a frame is received in (one of) these time slices, the information is inconsistent. The station returns to synchronization, or shuts off when a number of attempts—still to be determined—is attained.
c Determine system state: The station sets all stations in its own system-state vector as excluded, and observes the message procedure for the length of an undisturbed TDMA cycle (only N frames are transmitted). The station sets all stations whose time slice is not invalidated by VETO as included. Rule 26c can be executed parallel to Rule 26b.
Rule 27
   If, during the synchronization phase, a frame having the protocol message (NULL, CHANGECYCLE) is received correctly and not invalidated, the included check sum is compared to the station's own check sum. If a difference is present (difference between the cycle information in the system and the station's own cycle information), the station shuts off. Otherwise, the current cycle, the current time slice, the state vector and the new cycle number are incorporated. Synchronization is thus ended.

Figure 16:
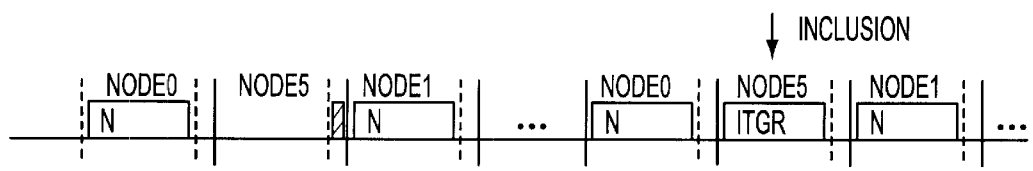
FIG. 16 depicts the protocol course in (re-) inclusion of a station.

The following rules are decisive for the inclusion of a station. FIG. 16 shows an inclusion.
Rule 28
   Stations in the inclusion state essentially transmit no VETO signals.
Rule 29
a If a station does not change from passive operation directly, it must first determine the current cycle, the station's time slice and the current system-state vector in accordance with Rule 26 or 27. Messages are conducted further to the application in accordance with Rule 9 as soon as the current time slice and the cycle are known. If the station does not possess its own time slice in the cycle, it shifts directly into passive operation.
b If a station was protocol-synchronized through Rule 27 (or in the inclusion state), it transmits an application or NULL message, in accordance with Rule 8, in its first subsequent time slice. Otherwise, the station transmits an N frame with an INTEGRATE protocol message as soon as the protocol is running in normal operation.
c1 If the message is not invalidated, the station is integrated and immediately enters normal operation. The station is set as included by all stations, and the application receives notice (INTR_SYSCHANGE).
c2 In other cases, the station enters passive operation and proceeds with Rule 26.
Rule 30
   If an included station receives a normal frame with an INTEGRATE protocol message from another station in normal operation, the included cycle, the time slice, the system-state vector and the check sum of the cycle information are compared to the station's own values. In the event of a difference, the message is invalidated by a VETO signal.
Rule 31
   If a station receives no frame for the length of a TDMA cycle during inclusion, the station enters initialization.

The rules for mode changes are as follows:
Rule 32
   If an included station enters its time slice in normal operation, it transmits a CHANGECYCLE protocol message if the application correspondingly requests it. In addition to the current protocol information, the message includes the number of the requested cycle.
Rule 33
   If a station receives a CHANGECYCLE protocol message during normal operation, it checks whether the requested cycle was previously initiated by the station's own application (explicitly or ANY_CYCLE).
a If this is not the case, the station transmits VETO. A CHANGECYCLE message involving VETO is generally rejected. Afterward, a reconfiguration cycle is run, as is standard practice (in accordance with Rule 17), so a new mode change is prevented.
b If the CHANGECYCLE message is not acknowledged with VETO, all stations store the new cycle number and transmit all frames with a set GroupstationBit (not evaluating the cycle/slice bit) until the end of the current cycle. The new cycle can still be overridden by a new CHANGECYCLE message until the end of the cycle.
   All stations have the option of opposition if the request is transmitted in the time slice 0.
c Following the end of the running cycle, the new cycle is established. Stations that are not authorized to transmit in the new cycle are set as excluded, and enter passive operation. Stations that were not authorized to transmit in the previous cycle and are now eligible shift into the inclusion state if they are not permanently terminated (multiple times in accordance with Rule 19).

The following measures are suitable for covering the remaining risk detailed in Rule 12. They can be implemented very simply, and render the consistency in the system reproducible within a cycle:
Rule 34
   If a station receives a recovery frame following a correct, non-invalidated transmission of a normal frame, the station remains in normal operation.
Rule 35
   If a station currently in the reconfiguration cycle receives a normal frame from a station that is not the initially-disturbed station, the first station evaluates the frame as a recovery frame with a cancelled error bit. If the normal frame is a CHANGECYCLE protocol message, the time slice is invalidated by VETO.

Literature

[1] SAE Handbook Volume 2, Parts and Components:
Class C Application Requirement/Survey of Known Protocols, pp. 23.366 et seq., 1994
[2] ISO 11898: Road vehicles—Interchange of digital information—Controller area network (CAN) for high-speed communication, 1993
[3] Telefunken Electronics:
Automotive Bit-serial Universal-interface System (ABUS), 8/88
[4] IEC TC9 WG 22:
Train Communication Network (1. General Architecture, 2. Real-Time Protocols, 3. Multifunction Vehicle Bus, 4. Wire Train Bus), Working Document 3/94
[5] H. Kopetz, W. Ochsenreiter:
Clock Synchronization in Distributed Real-Time Systems, IEEE Transactions on Computers, Vol. C-36, No. 8, 8/87
[6] H. Kopetz, W. Ochsenreiter:
Clock Synchronization UNIT (CSU) Datasheet, Research Report 22/89, Technische Universität [Technical University] of Vienna, November 1989
[7] K. Hoyme, K. Driscoll:
SAFEbus™, Honeywell Systems and Research Center, (Draft in ARINC 659, Boing 777), IEEE AES Systems Magazine, 3/93
[8] H. Kopetz, G. Grüunsteidl:
TTP—A Time Triggered Protocol for Automotive Applications,
Technische Universität [Technical University] of Vienna, 10/92, and
The 23rd International Symposium on Fault-Tolerant Computing, Toulouse 6/93
[9] ISO/IEC 8802-4, ANSI/IEEE Std 802.4:
Token-Passing Bus Access Method and Physical Layer Specifications, 1990
[10] IEEE Std 802.5:
Token Ring Access Method and Physical Layer Specifications, 1989
[11] ISO/IEC 8802-3, ANSI/IEEE Std 802.3:
Carrier Sense Multiple Access with Collision Detection (CSMA/CD) Access Method and Physical Layer Specifications, 1990
[12] MIL-STD-1553B:
Aircraft Internal Time Division Command/Response Multiplex Data Bus, 9/78
[13] ARINC 629-2 Multi-Transmitter Data Bus, Technical Description,
Aeronautical Radio INC, 10/91
[14] Hopkins et al.: U.S. Pat. No. 4,161,786,
Digital Bus Communication System

What is claimed is:
1. A communication system for critical-security applications comprising:
a plurality of transmitting and receiving stations for transmitting and receiving messages;
means for transmitting messages between respective transmitting and receiving stations, said transmitting means being based on a continuously-deterministic allocation of time slices where said time slices are allocated to a respective station in communication cycles and said transmitting means are programmed so that there is global consistency among all of the stations in the system, said time slices being respectively subdivided into a temporal transfer window for transmitting the message and an acknowledgement window following said transfer window;
means for transmitting a VETO signal in the acknowledgement window from an affected receiving station when a transmission error occurs, said VETO signal indicating a message was one of received erroneously and not received by the affected receiving station during a previous time slice and said VETO signal having no additional information beyond its presence in order to increase the recognition of the VETO signal, even in the presence of a disturbance signal; and
means, associated with the means for transmitting messages, for transmitting a VETO signal until the end of the acknowledgement window so that a disturbance signal that is misinterpreted locally by one of the transmitting and receiving stations and erroneously recognized as a VETO signal is converted into a VETO signal throughout the plurality of transmitting and receiving stations.

2. A communication system according to claim 1, wherein the VETO signal is implemented as a dominant signal.

3. A communication system according to claim 1, further comprising means for activating a reconfiguration cycle in all of the plurality of transmitting and receiving stations, following the reception of a VETO signal in the acknowledgement window of a previously-active transmitting station, wherein all stations execute a reconfiguration cycle to determine the exact cause of the transmission error.

4. A communication system according to claim 3, further comprising means for terminating the affected station by one of the communication system and the affected station, if a permanent error exists and is detected.

5. A communication system according to claim 3, wherein said means for activating a reconfiguration cycle includes:
means for setting a plurality of variables or flags in a first way, at the beginning of the reconfiguration cycle, for receiving stations that have received no transmission or no correct transmission in the previous time slice wherein the first way of setting the variables or flags are opposite to the respective variables or flags set in a receiving station that has received a correct transmission in the previous time slice;
means for transmitting messages from all active receiving stations during said reconfiguration cycle with a set reconfiguration bit (r) and a value previously stored in an error variable as an error bit (f) in a respective time slice of the respective receiving station where if a receiving station receives the set reconfiguration bit correctly, a reconfiguration variable is set to indicate that the reconfiguration bit has been received correctly, and if the error bit (f) in the respective message is set to TRUE, another receiving station was initially disturbed;
means for returning all transmitting and receiving stations to normal operation if an initially disturbed station transmits a further time slice, which does not have a VETO signal in the acknowledgement window;
means for re-evaluating variables or flags of receiving stations, at the end of the reconfiguration cycle, where the receiving station terminates itself and sets all transmissions, if a transmission window of a further time slice of the initially-disturbed transmitting station passes and the receiving station detects another transmission error in the further time slice, if the reconfiguration variable indicates that the receiving station cannot receive a message correctly from another transmitting station, and if the reconfiguration variable indicates that the receiving station received the correct message, the error bit of the respective message is set to FALSE and a VETO signal is not initiated by another receiving station; and means for terminating the disturbed transmitting station and causing all of the receiving stations to ignore further transmission errors in time slices of the disturbed transmitting station, if the reconfiguration bit indicates that a message was received correctly by a respective receiving station and the error bit is set to TRUE, in this case, the respective receiving station transmitting the VETO signal indicating that the disturbed transmitting station time slice was disturbed.

6. A communication system according to claim 5, wherein a burst disturbance that does not last for more than one communication cycle does not result in an erroneous termination of a transmitting station.

7. A communication system according to claim 6, wherein periodic disturbances of a duration less than an acknowledgement window of a time slice do not result in an erroneous termination of a transmitting station.

8. A communication system according to claim 7, wherein, if two partial communication cycles are combined into one communication cycle and all stations assuming critical security tasks are authorized to transmit in the partial communication cycles, the transmission authorization exists in different time slices of the partial cycles.

9. A communication system according to claim 1, wherein said means for transmitting messages between respective transmitting and receiving stations includes a protocol controller, a dual-port RAM in communication with said protocol controller, an application system having a processor (CPU) in communication with said dual-port RAM where a dual-channel bus provides the communication between the above-mentioned elements.

10. A communication system according to claim 9, wherein dual-port RAM is divided into a first part and a second part, said first part being CPU write-authorized and said second part being protocol controller write authorized.

11. A method of communicating for critical-security applications comprising the steps of:

transmitting messages between a plurality of transmitting and receiving stations, said transmitting step being based on a continuously-deterministic allocation of time slices where said time slices are allocated in communication cycles to a respective station and said transmitting step being programmed so that there is global consistency among all of the stations in the system, said time slices being respectively subdivided into a temporal transfer window for transmitting the message and an acknowledgement window following said transfer window;

transmitting a VETO signal in the acknowledgement window from an affected receiving station when a transmission error occurs, said VETO signal indicating a message was one of received erroneously and not received by the affected receiving station during a previous time slice and said VETO signal having no additional information beyond its presence in order to increase the recognition of the VETO signal, even in the presence of a disturbance signal; and transmitting a VETO signal until the end of the acknowledgement window so that a disturbance signal that is misinterpreted locally by one of the transmitting and receiving stations and erroneously recognized as a VETO signal is converted into a VETO signal throughout the plurality of transmitting and receiving stations.

12. A method of communicating according to claim 11, further comprising the step of activating a reconfiguration cycle in all of the plurality of transmitting and receiving stations, following the reception of a VETO signal in the acknowledgement window of a previously-active transmitting station, wherein all stations execute a reconfiguration cycle to determine the exact cause of the transmission error.

13. A method of communicating according to claim 12, further comprising the step of terminating the affected station if a permanent error exists and is detected.

14. A method of communicating according to claim 12, wherein said activating step includes:

setting a plurality of variables or flags in a first way, at the beginning of the reconfiguration cycle, for receiving stations that have received no transmission or no correct transmission in the previous time slice wherein the first way of setting the variables or flags are opposite to the respective variables or flags set in a receiving station that has received a correct transmission in the previous time slice;

transmitting messages from all active receiving stations during said reconfiguration cycle with a set reconfiguration bit (r) and a value previously stored in an error variable as an error bit (f) in a respective time slice of the respective receiving station where if a receiving station receives the set reconfiguration bit correctly, a reconfiguration variable is set to indicate that the reconfiguration bit has been received correctly, and if the error bit (f) in the respective message is set to TRUE, another receiving station was initially disturbed;

returning all transmitting and receiving stations to normal operation if an initially disturbed station transmits a further time slice, which does not have a VETO signal in the acknowledgement window;

re-evaluating variables or flags of receiving stations, at the end of the reconfiguration cycle, where the receiving station terminates itself and sets all transmissions, if a transmission window of a further time slice of the initially-disturbed transmitting station passes and the receiving station detects another transmission error in the further time slice, if the reconfiguration variable indicates that the receiving station cannot receive a message correctly from another transmitting station, and if the reconfiguration variable indicates that the receiving station received the correct message, the error bit of the respective message is set to FALSE and a VETO signal is not initiated by another receiving station; and terminating the disturbed transmitting station and causing all of the receiving stations to ignore further transmission errors in time slices of the disturbed transmitting station, if the reconfiguration bit indicates that a message was received correctly by a respective receiving station and the error bit is set to TRUE, in this case, the respective receiving station transmitting the VETO signal indicating that the disturbed transmitting station time slice was disturbed.

15. A method of communicating according to claim 14, wherein a burst disturbance that does not last for more than one communication cycle does not result in an erroneous termination of a transmitting station.

16. A method of communicating according to claim 15, wherein periodic disturbances of a duration less than an acknowledgement window of a time slice do not result in an erroneous termination of a transmitting station.

* * * * *